United States Patent [19]

Morita et al.

[11] 4,089,932
[45] May 16, 1978

[54] PROCESS FOR THE PRODUCTION OF SPHERICAL SILICA GEL

[75] Inventors: Yazaemon Morita; Yukitoshi Kogure, both of Tokyo; Akira Nomura, Kawasaki, all of Japan

[73] Assignee: Director-General of the Agency of Industrial Science & Technology, Tokyo, Japan

[21] Appl. No.: 668,615

[22] Filed: Mar. 19, 1976

[30] Foreign Application Priority Data

Apr. 3, 1975 Japan ................................. 50-39829

[51] Int. Cl.$^2$ .............................................. C01B 33/12
[52] U.S. Cl. ..................................... 423/338; 423/339; 252/448; 252/451
[58] Field of Search ............... 423/338, 339; 252/448, 252/451

[56] References Cited

U.S. PATENT DOCUMENTS

| | | | |
|---|---|---|---|
| 2,568,352 | 9/1951 | Milligan | 252/448 |
| 2,570,063 | 10/1951 | Kimberlin | 252/448 |
| 2,672,453 | 3/1954 | Wankat | 252/448 |
| 2,978,298 | 4/1961 | Wetzel et al. | 423/338 |
| 3,258,311 | 6/1966 | Burzyaski et al. | 252/448 |
| 3,290,122 | 12/1966 | Clinton et al. | 252/448 |
| 3,321,276 | 5/1967 | Burzyaski et al. | 252/448 |
| 3,464,928 | 9/1969 | Mathies | 252/448 |
| 3,857,924 | 12/1974 | Halasz et al. | 423/338 |
| 4,006,175 | 1/1977 | Termin et al. | 423/338 |
| 4,011,096 | 3/1977 | Sandell | 423/338 |

FOREIGN PATENT DOCUMENTS 559,450   6/1958   Canada ................ 423/338

*Primary Examiner*—O. R. Vertiz
*Assistant Examiner*—Eugene T. Wheelock

[57] ABSTRACT

A process for the production of spherical silica gel which comprises emulsifying water glass in a dispersion medium composed of a polar solvent and a non-polar solvent and gelling the water glass while maintaining it in emulsified state.

10 Claims, No Drawings

PROCESS FOR THE PRODUCTION OF SPHERICAL SILICA GEL

BACKGROUND OF THE INVENTION

The present invention relates to a process for the production of spherical silica gel from water glass.

Silica gel is useful not only as a column filler for liquid or gas chromatography but also as a catalyst or a support thereof for use in various catalytic reactions. Hitherto, powdery silica gel and spherical silica gel are known in this art generally as silica gel. As the spherical silica gel is superior to the powdery silica gel in respect of quality and useful properties in actual use, the demand for the former is now increasing. However, the production of spherical silica gel is difficult and thus involves a problem of higher cost. In general, spherical silica gel is produced by hydrolysis of tetraalkoxysilanes. Since tetraalkoxysilanes used as starting material in this case are expensive, the spherical silica gel obtained therefrom becomes unavoidably higher in the cost. Thus, there is a great demand for developing a process for producing spherical silica gel economically.

BRIEF SUMMARY OF THE INVENTION

Accordingly, it is an object of the present invention to provide an economical process for producing spherical silica gel in a simple manner.

It is another object of the present invention to provide a process for the production of spherical silica gel from water glass.

It is still another object of the present invention to provide a method of making water glass spherical.

Other objects, features and advantages of the pesent invention will be apparent more fully from the following description.

DETAILED DESCRIPTION OF THE INVENTION

As a result of research made for developing a process for producing spherical silica gel economically and easily, it has now been found that spherical silica gel of high quality can easily be obtained when water glass is emulsified in a dispersion medium composed of a mixture of a polar solvent and a non-polar solvent and then gelled while in emulsified state. The present invention is based on the above finding.

In accordance with the present invention, there is provided a process for the production of spherical silica gel characterized by emulsifying water glass in a dispersion medium composed of a mixture of a polar solvent and a non-polar solvent to form spherical silica sol and thereafter gelling the spherical sol while maintaining it in emulsified state.

The starting material used in the process of this invention is water glass which is a concentrated aqueous solution (sol) of a glass of the alkali-silicic acid series wherein the alkali is $Na_2O$ or $K_2O$. The concentration of the water glass is about 1–50% by weight, preferably 3–30% by weight in terms of silica ($SiO_2$).

In the present invention, the sol-forming water glass is emulsified in the dispersion medium and then gelled while in the emulsified state. In this case, it is necessary to use a mixture of a polar solvent and a non-polar solvent as the dispersion medium. When water glass is added to such solvent mixture and stirred vigorously therein, spherical silica sol is formed and dispersed into the solvent mixture. As the surface of the silica sol is of a polar nature, the polar group of the polar solvent is attached and oriented onto the surface of the silica sol while the non-polar solvent is oriented to the non-polar group existing in the other end of the polar solvent, whereby the silica sol is homogeneously emulsified. Under such condition, the formation of the silica sol particles in close vicinity to one another is inhibited so that any deformation of the spherical shape of the silica sol particles caused by mutual approach or impingement of the particles is prevented, thus ensuring gellation of the sol particles while maintaining them in spherical shape.

Utilizable as the polar solvent are aromatic or aliphatic hydrocarbon solvents, especially aliphatic hydrocarbons with 2–20, preferably 4–10 carbon atoms, having a terminal polar group such as hydroxyl group, sulfonyloxy group, amino group or carboxyl group. In view of cost and easiness in preparation, the use of an alcohol is preferable in the present invention. Illustrative of such alcohols are ethyl alcohol, butyl alcohol, hexyl alcohol, octyl alcohol and dodecyl alcohol.

Any of the non-polar solvents can be used for the present invention as long as they are miscible with the polar solvent. Generally, paraffinic or olefinic hydrocarbons with 5–50 carbon atoms are used as the non-polar solvent. Besides these aliphatic hydrocarbons, aromatic solvents are also utilizable as the non-polar solvent. Preferable examples of the non-polar hydrocarbon solvents are pentane, hexane, heptane, octane, dodecane, liquid paraffin, octene and dodecene. If the production of the spherical silica gel having a large particle diameter is desired, a non-polar solvent which has a smaller number of carbon atoms is generally employed. On the other hand, if the production of the spherical silica gel having a small particle size is desired, a non-polar solvent which has a larger number of carbon atoms is generally employed.

The mixing ratio of the polar solvent to the non-polar solvent cannot definitely be limited since it varies according to the sort of these solvents and the desired particle diameter of the spherical silica gel. Generally, however, the non-polar solvent is used in an amount of 1–100 parts by volume, preferably 5–30 parts by volume per 100 parts by volume of the polar solvent. A preferable example of the solvent mixture is a mixture of 20–60% by volume of n-hexanol and 40–80% by volume of liquid paraffin.

The quantity of water glass added to the dispersion medium varies according to the desired particle diameter of the spherical silica gel and other factors. Generally, however, the quantity of water glass in terms of silica ($SiO_2$) is 0.01–20 parts by weight, preferably 0.1–5 parts by weight per 100 parts by weight of the dispersion medium.

The spherical silica sol emulsified and dispersed into the solvent mixture is gelled while being kept in such state. The gellation treatment in this case is attained by previously adjusting the pH value of the starting water glass and controlling the gelling velocity slower than the emulsifying velocity or alternatively by adding an acid or alkali as gelling agent to the dispersion medium. As the water glass sol is gelled most rapidly at a pH value within a range of 3–7, the process of the present invention is preferably carried out in such manner that the water glass is emulsified at a pH outside the above mentioned range to avoid rapid premature gelling and thereafter gelled by addition of a gelling agent. Any of the acids or bases which are soluble in the solvent used can be used as a gelling agent or an agent for adjusting the gelling velocity. Examples of the acids used in this case include organic acids such as acetic acid, butyric acid, benzoic acid and organosulfonic acid and inorganic acids such as hydrochloric acid and sulfuric acid. Examples of the bases used in this case include alkali hydroxides such as sodium hydroxide and potassium hydroxide and organic bases such as amines and pyridines.

According to the process of this invention, it is possible to produce uniform spherical silica gel particles having a particle diameter of 5–50μm. The particle diameter can freely be adjusted by changing the composition (viscosity) of the organic solvent mixture used as a dispersion medium and controlling the rotation speed of a stirrer used for emulsifying the water glass.

Table 1 shows the relation between the rotation speed (r.p.m.) of a stirrer and the particle diameter (μm) of the formed silica gel particles in the case of producing spherical silica gel in a dispersion medium (having a viscosity of above 20cp) composed of a mixture of 1 part by volume of n-hexanol and 1 part by volume of liquid paraffin.

Table 1

| Rotation speed (r.p.m.) | Average particle diameter (μm) |
|---|---|
| 500 | 40 |
| 750 | 25 |
| 1000 | 18 |
| 1250 | 15 |
| 1500 | 13 |
| 2000 | 10 |
| 2500 | 7 |

Table 2 shows the relation between the viscosity (cp) of the dispersion medium and the particle diameter (μm) of the formed silica gel particles in the case of producing the silica gel in the dispersion medium having different viscosities wherein the mixing ratio of n-hexanol to liquid paraffin is varied.

Table 2

| Viscosity (cp) | Average particle diameter (μm) |
|---|---|
| 3 | 50 |
| 6 | 30 |
| 12 | 25 |
| 30 | 16 |
| 40 | 14 |
| 60 | 10 |
| 80 | 8 |
| 100 | 5 |

As is evident from these tables, the particle diameter of the formed silica gel particles becomes smaller when the rotation speed of a stirrer or the viscosity of the dispersion medium becomes higher on emulsifying the silica sol.

Separation of the spherical silica gel from the dispersion medium can be performed in a conventional manner. For example, the spherical silica gel can be obtained by adding an aqueous alcohol to the dispersion medium containing the spherical silica gel to transfer it into the aqueous alcoholic phase, allowing the mixture to stand stationary, separating the aqueous alcoholic phase from the dispersion medium, separating the silica gel from the aqueous alcoholic phase, washing the silica gel thoroughly with water and then drying the silica gel. The resultant spherical silica gel is then subjected to a baking treatment conducted at a temperature as high as 500–800° C or to a lyophilizing treatment, whereby moisture present in the spherical silica gel is vaporized to make it porous.

The use of a foaming agent is not particularly required in the production of the porous spherical silica gel according to the present invention. At the time of emulsifying and/or gelling the silica sol, however, a foaming agent can be added to the dispersion medium so as to facilitate the formation of porous product. Any of the foaming agents conventionally used for the preparation of porous silica gel can be employed for this purpose. Examples of such foaming agent include water, alcohols with 1–4 carbon atoms such as methanol and ethanol, ketones such as acetone and methyl ethyl ketone, and other liquids capable of penetrating into the silica sol. Such foaming agent is used in an amount sufficient to have a concentration of 1–20% by weight, preferably 1–10% by weight in the silica sol. In order to incorporate the foaming agent into the dispersion medium, a given amount of the foaming is previously added to the starting water glass or the gelling agent. The existence of the foaming agent in the dispersion medium permits the formation of spherical silica gel containing the foaming agent which, in the subsequent drying and baking or lyophilizing treatments, will be released from the silica gel by evaporation to afford a porous silica gel.

The present invention will now be explained in more detail by way of examples.

It is to be construed, however, that the scope of the invention is not limited to these specific examples.

EXAMPLE 1

Water glass adjusted to have a pH value of about 5 was added to a dispersion medium composed of an equiamount mixture of n-hexanol and liquid paraffin while stirring the dispersion medium with a stirrer rotating at a speed of 1000 r.p.m. The mixture was maintained in such a state for about 30 minutes whereby the silica sol was made spherical and gelled. 50% aqueous methanol was added to the mixture and the whole was stirred and then allowed to stand stationary whereupon the silica gel particles formed were transferred into the aqueous methenol phase. The silica gel particles were then separated from the aqueous methanol phase, washed with water, ethanol, hexane and butanol in the written order of succession, and then dried whereby spherical silica gel having a particle diameter of 20±10μm was obtained.

EXAMPLE 2

Water glass adjusted to have a pH value below 5 was emulsified in the same manner as described in Example 1. Aniline or pyridine was then added to adjust the pH value of the dispersion medium to 5–6. The mixture was stirred in this state for about 30 minutes. 50% aqueous ethanol was then added to the mixture to transfer the silica gel particles into the aqueous ethanol phase and then worked up in a manner similar to that described in Example 1 whereby spherical silica gel having a particle diameter of 20±10μm was obtained.

EXAMPLE 3

A small amount of ethanol was added to water glass the pH value of which had not been adjusted (pH: above 7). The water glass was emulsified in the same manner as described in Example 1 and then acetic acid was added to the disperison medium to adjust the pH value thereof to about 5 whereby gellation of the emulsified silica sol was effected. The silica gel thus formed was subjected to the same after treatments as described in Example 1 whereby spherical silica gel having a particle diameter of 20±10μm was obtained. When this product was dried at 200° C and then baked at 600° C, a porous spherical silica gel having uniform small voids was obtained.

Obviously many modifications and variations of the present invention are possible in the light of the above teachings. It is to be understood therefore that the present invention is not limited specific embodiments thereof except as defined in the specification.

What is claimed is:

1. A process for the production of spherical silica gel which comprises emulsifying water glass in a dispersion medium composed of a mixture of, by volume, 20–60% n-hexanol as polar solvent and 40–80% liquid paraffin as non-polar solvent, said water glass being present in an amount of 0.01–20 parts by weight per 100 parts by weight of said dispersion medium, based on its silica content, to form a spherical silica sol; and thereafter gelling said sol while maintaining it in an emulsified state.

2. A process according to claim 1 wherein said water glass is a concentrated aqueous solution of a glass of alkali-silicic acid series containing about 1–50% by weight of silica.

3. A process according to claim 1 wherein said sperhical silica gel is separated from said dispersion medium and thereafter moisture contained in the said spherical silica gel is removed by evaporation to make the said spherical silica gel porous.

4. A process according to claim 1 wherein said spherical silica gel is made porous by heating it at a temperature of 500°–800° C.

5. In the process for the production of spherical silica gel by emulsifying water glass in a dispersion medium composed of a mixture of polar and non-polar solvents to form a spherical silica sol and thereafter gelling said sol while maintaining it in an emulsified state, the improvement which comprises employing as the dispersion medium a mixture of, by volume, 20–60% n-hexanol as polar solvent and 40–80% liquid paraffin as non-polar solvent, said water glass being present in an amount of 0.01–20 parts by weight per 100 parts by weight of said dispersion medium, based on its silica content; adding to the dispersion medium a foaming agent selected from the group consisting of methane, ethanol, acetone and methyl ethyl ketone and subsequently removing said forming agent from the produced sperhical silica gel by evaporation, so as to obtain a porous spherical silica gel.

6. A process according to claim 5 wherein said spherical silica gel is made porous by a lyophilizing treatment.

7. A process according to claim 5 wherein said water glass is a concentrated aqueous solution of a glass of alkali-silicic acid series containing about 1–50% by weight of silica.

8. A process according to claim 5 wherein said foaming agent is a polar solvent with 1–4 carbon atoms.

9. A process according to claim 5 wherein said foaming agent is methanol or ethanol.

10. A process according to claim 5 wherein said foaming agent is acetone or methyl ethyl ketone.

* * * * *